US005941497A

United States Patent [19]

Inoue et al.

[11] Patent Number: 5,941,497

[45] Date of Patent: Aug. 24, 1999

[54] ANTENNA FIXTURE

[75] Inventors: Shigemi Inoue; Shigeru Ueno; Kenichi Fujita; Kazunori Kato, all of Kobe, Japan

[73] Assignee: DX Anteena Co., Ltd., Hyogo, Japan

[21] Appl. No.: 08/919,786

[22] Filed: Aug. 29, 1997

[30] Foreign Application Priority Data

Mar. 13, 1997 [JP] Japan .................................... 9-58727

[51] Int. Cl.$^{6}$ .................................................. F16M 13/00

[52] U.S. Cl. ....................... 248/514; 248/515; 248/291.1; 343/880

[58] Field of Search .................................... 248/514, 515, 248/476, 534, 201, 202.1, 220.21, 220.22, 222.51, 291.1, 292.14, 299.1, 490, 495; 343/880, 881, 882

[56] References Cited

U.S. PATENT DOCUMENTS 2,734,708 2/1956 Cohn .................................... 248/299.1
5,344,110 9/1994 Scarpa .................................. 248/291.1

*Primary Examiner*—Leslie A. Braun
*Assistant Examiner*—Willie Berry, Jr.
*Attorney, Agent, or Firm*—Birch, Stewart, Kolasch & Birch, LLP

[57] ABSTRACT

An antenna fixture includes a mount fixture for mounting a parabolic reflecting mirror to a mast fixture fixed to a mast. The mount fixture makes it possible to adjust the azimuth angle and elevation angle of the parabolic reflecting mirror. The mast fixture is a cylindrical body capable of being externally pressure fitted to the mast. The mast fixture includes upper mounting leaves and lower mounting leaves provided with tapped holes. The mount fixture includes side walls, which are externally fitted to the upper and lower mounting leaves. The to side walls include supporting holes which allow bolts to be passed therethrough and threadably attached to the tapped holes of the upper mounting leaves. Near the supporting holes are located azimuth-angle adjusting circular arc holes formed with the supporting holes as a center. Elevation-angle adjusting circular-arc holes are also formed in the side walls with the supporting holes as a center. Bolts are passed through the elevation-angle adjusting circular-arc holes and threadably attached to the tapped holes of the lower mounting leaves. Inserting holes are bored in the mast fixture opposite to the azimuth-angle adjusting circular-arc holes. A bar tool is inserted into the azimuth-angle adjusting circular-arc holes and the inserting holes to adjust the azimuth-angle.

5 Claims, 12 Drawing Sheets

ANTENNA FIXTURE

BACKGROUND OF THE INVENTION

The present invention relates to an antenna fixture which can be used to mount a parabolic reflecting mirror fixed to a mast and to adjust the azimuth angle and elevation angle of the parabolic reflecting mirror.

Heretofore as such antenna fixtures, there have been available those shown in FIGS. 11 and 12.

In FIG. 11, a mount fixture 102 is fixedly secured to the back of a parabolic reflecting mirror 101; the mount fixture 102 is connected with a mast fixture 103; and the parabolic reflecting mirror is held at the top of a mast 105 by the mast fixture 103 and a holder 104, and fixed with bolts 106. Reference code 107 designates a supporting arm; and reference code 108 designates a converter with a primary radiator.

Here, the azimuth angle of the parabolic reflecting mirror 101 is adjusted in such a manner that, with the bolts 106 left loosened to an extent that the parabolic reflecting mirror 101 can move, the parabolic reflecting mirror 101 is allowed to rotate in the arrow A direction around the mast 105 to align the azimuth angle with a predetermined value, and then fixed by tightening the bolts 106.

In FIG. 12, a mount fixture 202 is fixedly secured to the back of a parabolic reflecting mirror 201; the mount fixture 202 is connected through a rotating axis 211 with a mast fixture 203 which is swingable around the rotating axis 211; and the parabolic reflecting mirror is held at the upper portion of a mast 205 by the mast fixture 203 and a holder 204, and fixed with bolts 206.

An elevation-angle adjusting circular-arc hole 212 is carvedly provided in the mount fixture 202 formed around the rotating axis 211 as a center; and a bolt 213 is allowed to be inserted through the elevation-angle adjusting circular-arc hole 212 and to be threadably attached to the mast fixture 203. An adjusting screw 215 is threadably attached to a supporting leaf 214 protruded from the mast fixture 203; and an adjusting leaf 216 is protrusively provided at the position opposite to the supporting leaf 214 on the mount fixture 202, whereby the tip of the above-mentioned adjusting screw 215 is allowed to abut against the adjusting leaf 216.

Here, the elevation angle of the parabolic reflecting mirror 201 is adjusted by previously loosening the bolt 213, then adjusting the adjusting screw 215, and fixing the bolt 213.

The azimuth angle of the parabolic reflecting mirror shown in FIG. 11 is adjusted by holding the peripheral edge of the parabolic reflecting mirror with hands, so that a fine adjustment cannot be smoothly performed, The elevation angle of the parabolic reflecting mirror shown in FIG. 12 is adjusted in such a manner that a coarse adjustment and a fine adjustment are performed with a single adjusting screw. Moving the mount fixture with a larger angular range requires the adjusting screw to be moved further according to the range. This results in the and adjusting work not always being sufficiently easy and not being performed with good accuracy.

SUMMARY OF THE INVENTION

Therefore, in view of the above-mentioned circumstances and in order to make it possible to adjust easily and accurately the azimuth angle of a parabolic reflecting mirror, the present invention is made to provide an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided near the axis supporting holes with azimuth-angle adjusting circular-arc holes formed around the axis supporting holes as a center, and is carvedly provided with elevation-angle adjusting circular-arc holes formed around the axis supporting holes as a center for allowing bolts to be passingly inserted and threadably attached to the tapped holes of the lower mounting leaves, wherein the mount fixture is externally fitted to the mast fixture, the axis supporting bolts are allowed to be passingly inserted into the axis supporting holes and threadably attached to the tapped holes of the upper mounting leaves, and the bolts are allowed to be passingly inserted into the elevation-angle adjusting circular-arc holes and threadably attached to the tapped holes of the lower mounting leaves, and wherein passingly inserting holes are bored in the mast fixture opposite to the azimuth-angle adjusting circular-arc holes, and a bar tool is inserted into the azimuth-angle adjusting circular-arc holes and the passingly inserting holes to adjust the azimuth-angle.

Also, in oder to make it possible to adjust easily and accurately the elevation angle of a parabolic reflecting mirror, the present invention is made to provide an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided with elevation-angle adjusting circular-arc holes formed around the axis supporting holes as a center for allowing bolts to be passingly inserted and threadably attached to the tapped holes of the lower mounting leaves, wherein the mount fixture is externally fitted to the mast fixture, the axis supporting bolts are allowed to be passingly inserted into the axis supporting holes and threadably attached to the tapped holes of the upper mounting leaves, and the bolts are allowed to be passingly inserted into the elevation-angle adjusting circular-arc holes and threadably attached to the tapped holes of the lower mounting leaves, and wherein a wave washer is positioned between the bolt and the side wall to adjust the elevation-angle.

Further, in order to make it possible to adjust easily and accurately the azimuth angle and elevation angle of a parabolic reflecting mirror, the present invention is made to provide an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided near the axis supporting holes with azimuth-angle adjusting circular-arc holes formed around the axis supporting holes as a center, and is carvedly provided with elevation-angle adjusting circular-arc holes formed around the axis supporting holes as a center for allowing bolts to be passingly inserted and threadably attached to the tapped holes of the lower mounting leaves, wherein the mount fixture is externally fitted to the mast fixture, the axis supporting bolts are allowed to be passingly inserted into the axis supporting holes and threadably attached to the tapped holes of the upper mounting leaves, and the bolts are allowed to be passingly inserted into the elevation-angle adjusting circular-arc holes and threadably attached to the tapped holes of the lower mounting leaves, and wherein passingly inserting holes are bored in the mast fixture opposite to the azimuth-angle adjusting circular-arc holes, a bar tool is inserted into the azimuth-angle adjusting circular-arc holes and the passingly inserting holes to adjust the azimuth-angle, and a wave washer is positioned between the bolt and the side wall to adjust the elevation-angle.

Still further, in oder to make it possible to adjust easily and accurately the elevation angle of a parabolic reflecting mirror by positioning an adjusting plate between a mount fixture and a mast fixture, the present invention is made to provide an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided with elevation-angle adjusting circular-arc holes formed around the axis supporting holes as a center for allowing bolts to be passingly inserted and threadably attached to the tapped holes of the lower mounting leaves, wherein an adjusting plate is positioned between said mount fixture and the mast fixture, and is bored on the upper portion thereof with an adjusting plate axis supporting hole into which the axis supporting bolt is passingly inserted, carvedly provided at the position opposite to the elevation-angle adjusting circular-arc hole on the lower portion thereof with an adjusting plate elevation-angle adjusting circular-arc hole, and carvedly provided on the central portion thereof with a second elevation-angle adjusting circular-arc hole formed around the adjusting plate axis supporting hole as a center, and an adjusting screw is threadably attached to a supporting plate raised sideward, wherein the mount fixture is externally fitted to the mast fixture, the axis supporting bolts are allowed to be passingly inserted into the axis supporting holes and the adjusting plate axis supporting holes and threadably attached to the tapped holes of the upper mounting leaves, and the bolts are allowed to be passingly inserted into the elevation-angle adjusting circular-arc holes and the adjusting plate elevation-angle adjusting circular-arc holes and threadably attached to the tapped holes of the lower mounting leaves, and wherein a wide circular-arc hole is carvedly provided on the side wall opposite to the second elevation-angle adjusting circular-arc hole, an adjusting leaf is allowed to be raised on the side wall opposite to the supporting leaf, and the tip of said adjusting screw is rotatably fixed to the adjusting leaf to adjust the elevation angle.

Also, in oder to make it possible to adjust easily and accurately the azimuth angle of a parabolic reflecting mirror by positioning an adjusting plate between a mount fixture and a mast fixture, the present invention is made to provide an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided near the axis supporting holes with azimuth-angle adjusting circular-arc holes formed around the axis supporting holes as a center, and is carvedly provided with elevation-angle adjusting circular-arc holes formed around the axis supporting holes as a center for allowing bolts to be passingly inserted and threadably attached to the tapped holes of the lower mounting leaves, wherein an adjusting plate is positioned between said mount fixture and the mast fixture, and is bored on the upper portion thereof with an adjusting plate axis supporting hole into which the axis supporting bolt is passingly inserted, carvedly provided at the position opposite to the elevation-angle adjusting circular-arc hole on the lower portion thereof with an adjusting plate elevation-angle adjusting circular-arc hole, and carvedly provided on the central portion thereof with a second elevation-angle adjusting circular-arc hole formed around the adjusting plate axis supporting hole as a center, and an adjusting screw is threadably attached to a supporting plate raised sideward, wherein the mount fixture is externally fitted to the mast fixture, the axis supporting bolts are allowed to be passingly inserted into the axis supporting holes and the adjusting plate axis supporting holes and threadably attached to the tapped holes of the upper mounting leaves, and the bolts are allowed to be passingly inserted into the elevation-angle adjusting circular-arc holes and the adjusting plate elevation-angle adjusting circular-arc holes and threadably attached to the tapped holes of the lower mounting leaves, and wherein a wide circular-arc hole is carvedly provided on the side wall opposite to the second elevation-angle adjusting circular-arc hole, an adjusting leaf is allowed to be raised on the side wall opposite to the supporting leaf, the tip of said adjusting screw is rotatably fixed to the adjusting leaf to adjust the elevation angle, and a bar tool is inserted into the azimuth-angle adjusting circular-arc holes and the passingly inserting holes to adjust the azimuth-angle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
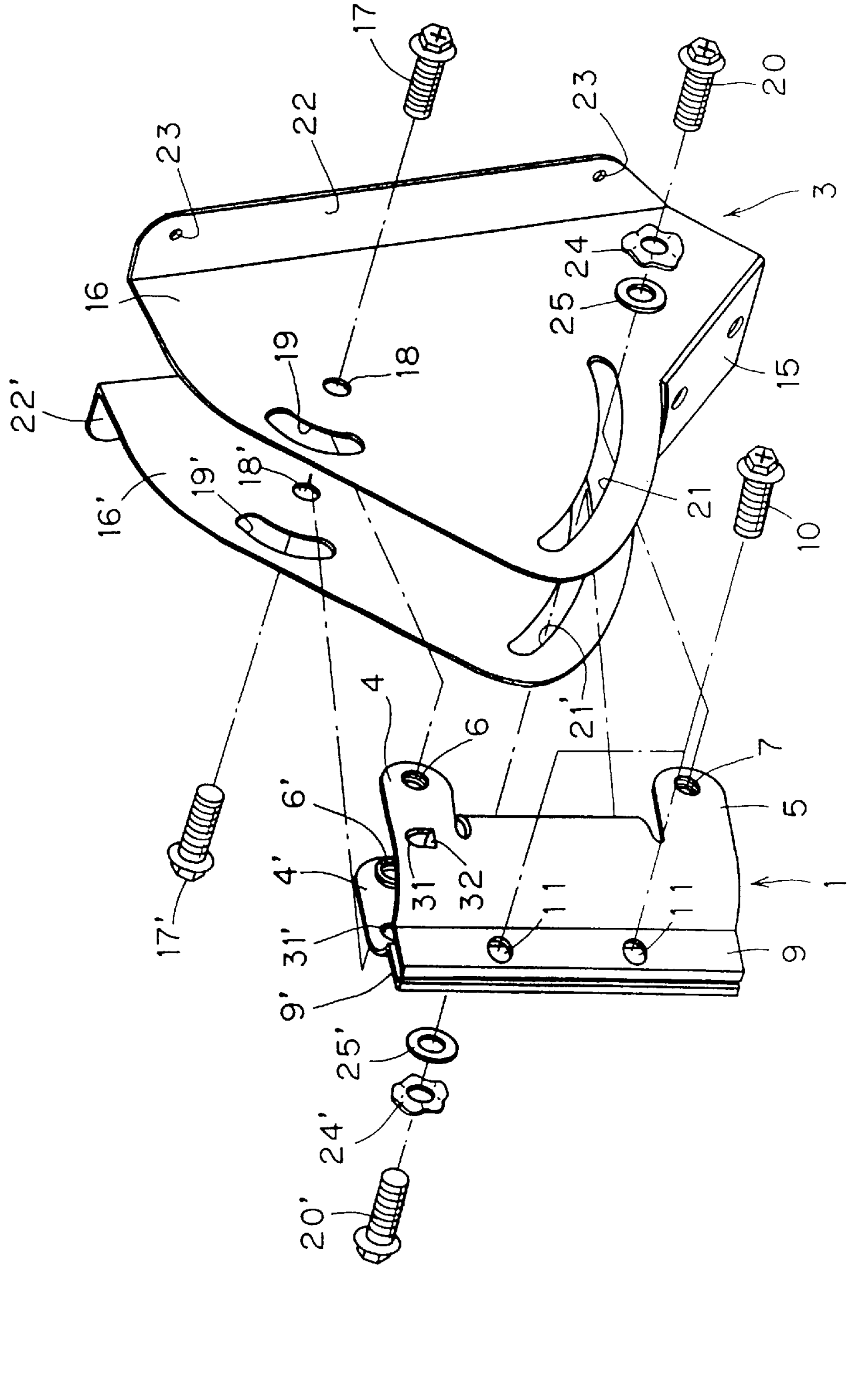
FIG. 1 is an exploded perspective view of principal parts of a specific embodiment of an antenna fixture of the present invention.

With reference to specific embodiments shown in attached drawings, the present invention will be explained in detail hereinafter.

As shown in FIGS. 1 through 4, the present invention comprises a mast fixture 1 for mounting a parabolic reflecting mirror 8, and a mount fixture 3 which is fixed to a mast 2 and connected to the above-mentioned mast fixture 1, thereby making it possible to adjust the azimuth angle and elevation angle of the parabolic reflecting mirror 8.

The mast fixture 1, which is made of sheet metal and a substantially-cylindrical body capable of being externally fitted to the mast 2 and tighteningly fixed, forms upper mounting leaves 4, 4' and lower mounting leaves 5, 5' (not shown), which are parallel to each other in the tangent line direction and opposite to each other, on the upper and lower part of the cylindrical body, the upper mounting leaves 4, 4' and the lower mounting leaves 5, 5' being carvedly provided with tapped holes 6, 6' and 7, 7' (not shown), respectively. Each of the tapped holes 6, 6' and 7, 7' is carvedly provided with a thread on the inner face of a cylindrical protruding cylinder formed by being machined inwardly through burring. Any tapped hole described hereinafter has the same meaning as above.

Protruded from cylindrial bodies opposite to each other having the upper mounting leaves 4, 4' and the lower mounting leaves 5, 5', respectively, are two tightening leaves 9, 9' parallel to each other in the longitudinal direction, the end of the tightening leaves being bent inwardly to have strength. With respect to the tightening leaves 9, 9', the tightening leaf 9 on the near side of bolts 10 is bored with bolt holes 11 for allowing the bolts to be passingly inserted, while the opposite tightening leaf 9' is carvedly provided with tapped holes similar to above, that is, tapped holes 12 (shown in FIGS. 3 and 4) carvedly provided with a thread on the inner face of the cylinder protruded by being machined through burring.

The mount fixture 3, which is made of sheet metal, is extendedly provided with side walls 16, 16', which are externally fitted to the above-mentioned upper mounting leaves 4, 4' and lower mounting leaves 5, 5'. The side walls 16, 16' are provided on both sides of a base wall 15 for mounting a supporting arm 13 whose top is mounted with a converter having a primary radiator (not shown). The side walls 16, 16' are bored with axis supporting holes 18, 18', which allow axis supporting bolts 17, 17' to be passingly inserted and threadably attached to the tapped holes 6, 6' of the upper mounting leaves 4, 4'. The supporting holes 18, 18' are located in the central portions of the side walls 16, 16'.

Carvedly provided near the axis supporting holes 18, 18' are azimuth-angle adjusting circular-arc holes 19, 19' formed around the axis supporting holes 18, 18' as a center.

Carvedly provided on the lower portion of the side walls 16, 16' are elevation-angle adjusting circular-arc holes 21, 21', which allow bolts 20, 20' to be passingly inserted and threadably attached to the tapped holes 7, 7' of the lower mounting leaves 5, 5'. The circular-arc holes 21, 21 are formed around the axis supporting holes 18, 18' as a center.

Figure 2:
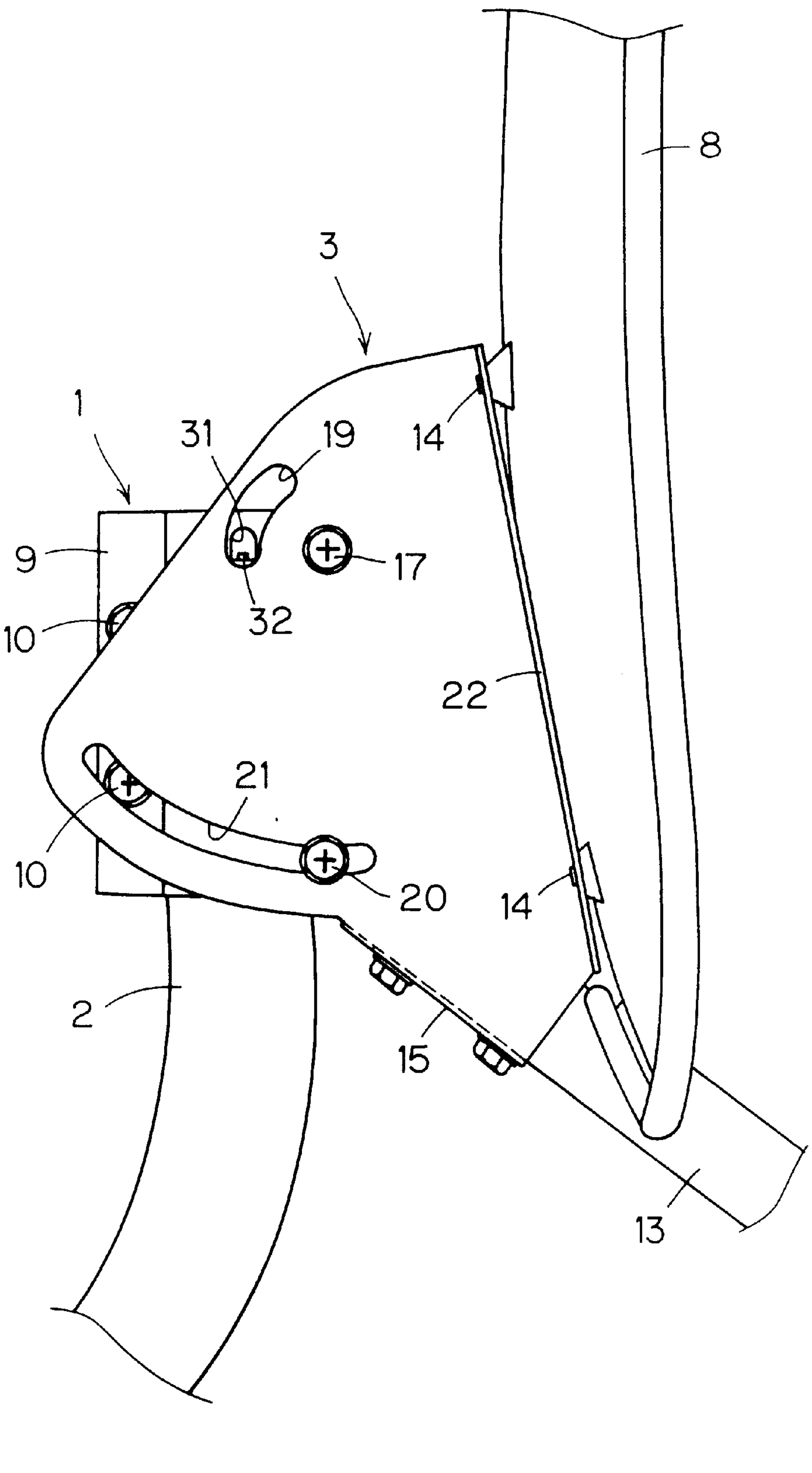
FIG. 2 is a side view of a mast and a parabolic reflecting mirror mounted to an antenna fixture of the present invention.
Figure 3:
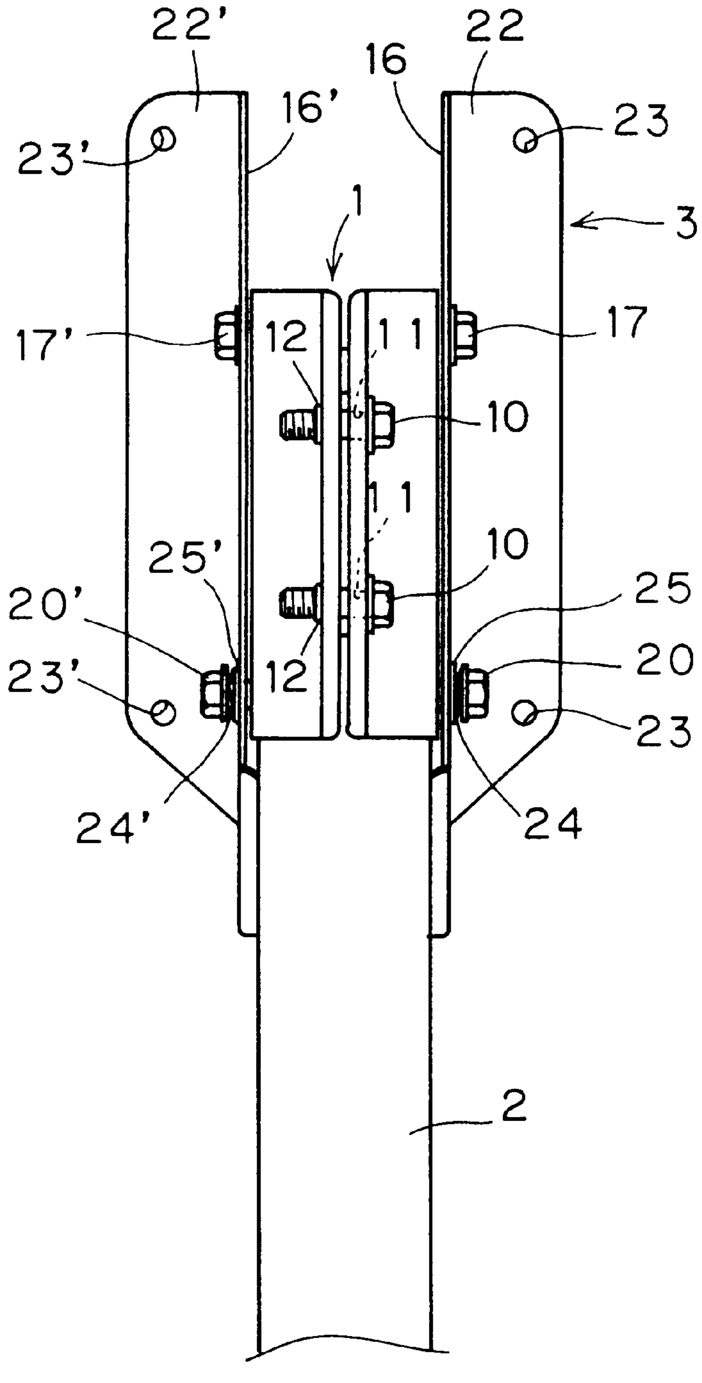
FIG. 3 is a back view of FIG. 2, with the parabolic reflecting mirror omitted.

Formed on the ends opposite to the base wall 15, of the side walls 16, 16' are outward-facing flanges 22, 22'. As shown in FIG. 3, the flanges 22, 22' are bored with mounting holes 23, 23' for mounting the parabolic reflecting mirror 8. As shown in FIG. 2, the parabolic reflecting mirror 8 is mounted using rivets 14.

The mount fixture 3 is externally fitted to the mast fixture 1, and the axis supporting bolts 17, 17' are allowed to be passingly inserted into the axis supporting holes 18, 18' and threadably attached to the tapped holes 6, 6' of the upper mounting leaves 4, 4'.

Wave washers 24, 24' formed into wave shape and flat washers 25, 25' are fitted onto the shank part of the bolts 20, 20' and allowed to be passingly inserted into the elevation-angle adjusting circular-arc holes 21, 21' and threadably attached to the tapped holes 7, 7' of the lower mounting leaves 5, 5'.

Passingly inserting holes 31, 31' are bored at positions (near the tapped holes 6, 6') of the mast fixture 1 opposite to the azimuth-angle adjusting circular-arc holes 19, 19' of the side walls 16, 16'. The passingly inserting holes 31, 31' are formed when stoppers 32, 32' are cut and raised upward. The top end of the mast 2, when the mast 2 is inserted into the mast fixture 1, abuts against the stoppers 32, 32' to stop.

FIGS. 2 and 3 show a state that the mast 2 is fixed to the mast fixture 1, and a state that the parabolic reflecting mirror 8 is fixed to the mount fixture 3, respectively, provided that in FIG. 3, the parabolic reflecting mirror 8 is not shown.

Figure 4:
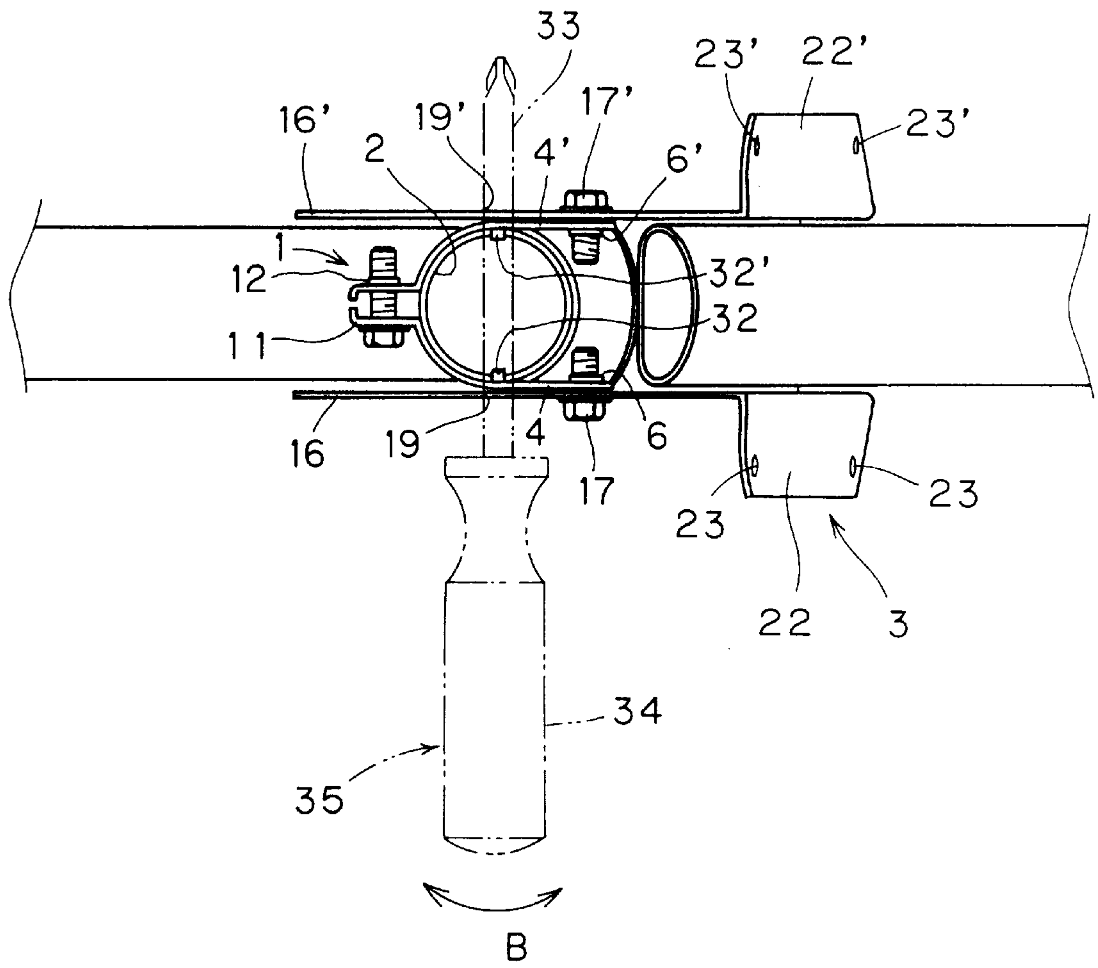
FIG. 4 is a plan view showing adjustment of an azimuth angle is adjusted according to the present invention.

The azimuth angle is adjusted in such a manner that, as shown in FIG. 4, a shank 33 of a screwdriver 35 consisting of the shank 33 having a Phillips head at its tip and a handle 34 is inserted into the azimuth-angle adjusting circular-arc hole 19, the passingly inserting hole 31, the passingly inserting hole 31' and the azimuth-angle adjusting circular-arc hole 19'. Then, the handle 34 is rotated in the arrow B direction to perform the coarse adjustment and fine adjustment of the azimuth angle, and then the bolts 10, 10' are tightened. In this manner, the azimuth angle of the parabolic reflecting mirror 8 can be adjusted very easily and accurately.

The adjustment of the elevation angle with this antenna fixture is performed by loosening the bolts 20, 20'. The wave washers 24, 24' are positioned between the side walls 16, 16', so that even when loosening the bolts 20, 20', the side walls 16, 16' are urged inwardly to cause the side walls 16, 16' to be pressingly in contact with the the upper mounting leaves 4, 4' and the lower mounting leaves 5, 5'. By this arrangement even when the parabolic reflecting mirror 8 has been mounted to the mount fixture 3, the mount fixture 3 will not rotate rapidly around the axis supporting bolts 17, 17', but will rotate gradually until a required elevation angle is obtained, thereby making it possible to perform an easy and accurate elevation angle adjusting operation.

The azimuth-angle adjusting circular-arc holes 19, 19' have been set at an angular range corresponding to the adjusting range of the elevation-angle adjusting circular-arc holes 21, 21'.

Then, with reference to FIGS. 5 through 10, an example in which an adjusting plate is positioned between the mount fixture 3 and the mast fixture 1 of the present invention will be explained in detail hereinafter.

In this case, the example will be explained by assigning the same reference numerals to the same parts and new reference numerals to different parts.

Figure 5:
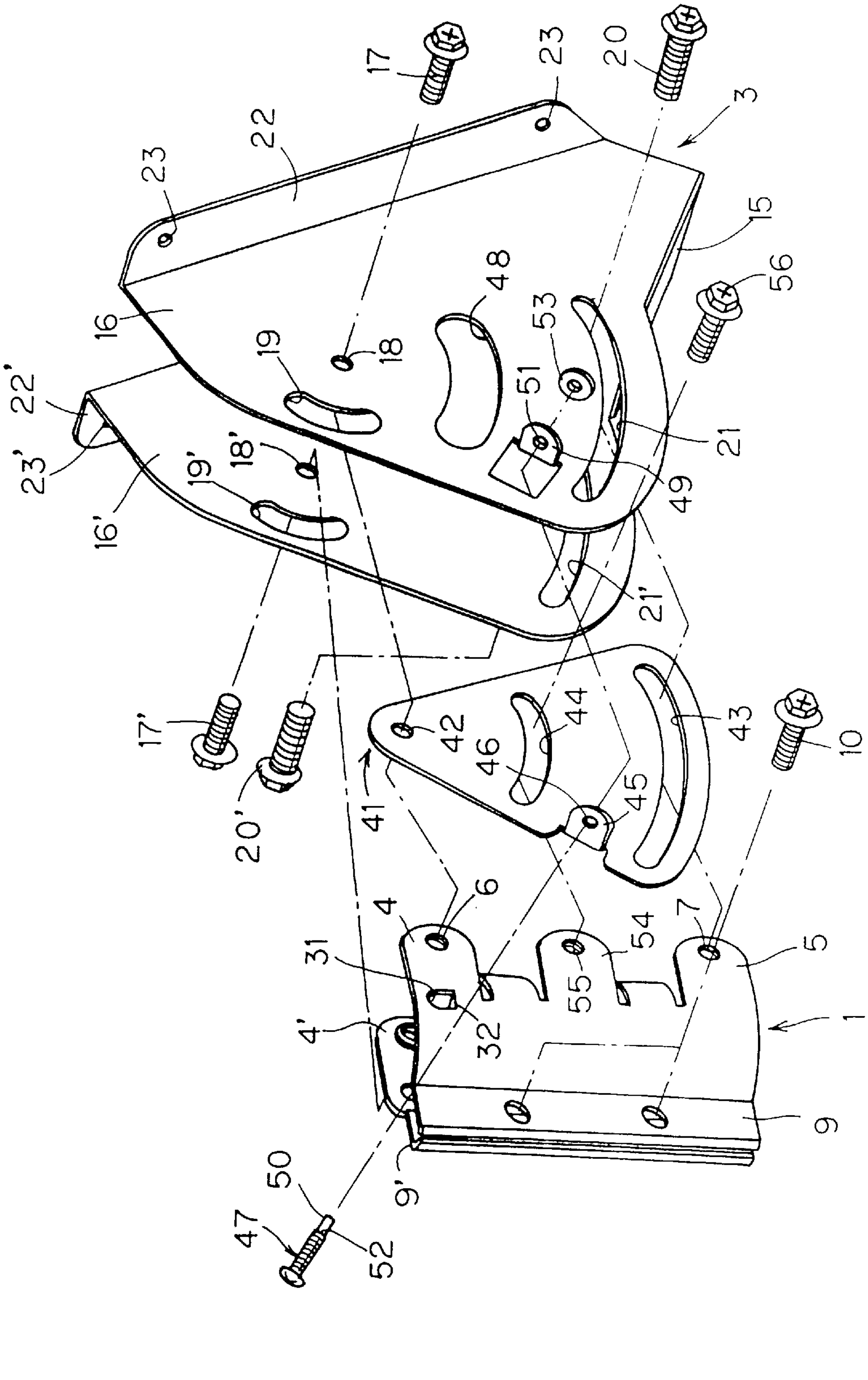
FIG. 5 is an exploded perspective view of principal parts of another embodiment.

An adjusting plate 41, as shown clearly in FIG. 5, is made of sheet metal and in a substantially triangular, circular-arc shape. The adjusting plate 41 is bored on the upper portion thereof with an adjusting plate axis supporting hole 42 into which the axis supporting bolt 17 is passingly inserted. The supporting hole 42 is carvedly provided at the position opposite to the elevation-angle adjusting circular-arc hole 21 on the lower portion thereof with an adjusting plate elevation-angle adjusting circular-arc hole 43 formed around the adjusting plate axis supporting hole 42 as a center, and carvedly provided on the central portion thereof with a second elevation-angle adjusting circular-arc hole 44 formed around the adjusting plate axis supporting hole 42 as a center. An adjusting screw 47 is threadably attached to a tapped hole 46 of a supporting plate 45 raised sideward.

The mount fixture 3 is externally fitted to the mast fixture 1, and the axis supporting bolt 17 is allowed to be passingly inserted into the axis supporting hole 18 and the adjusting plate axis supporting hole 42, and threadably attached to the tapped hole 6 of the upper mounting leaf 4.

A wide circular-arc hole 48 formed around the axis supporting hole 18 as a center is carvedly provided at the position opposite to the above-mentioned second elevation-angle adjusting circular-arc hole 44 of the side wall 16.

Figure 6:
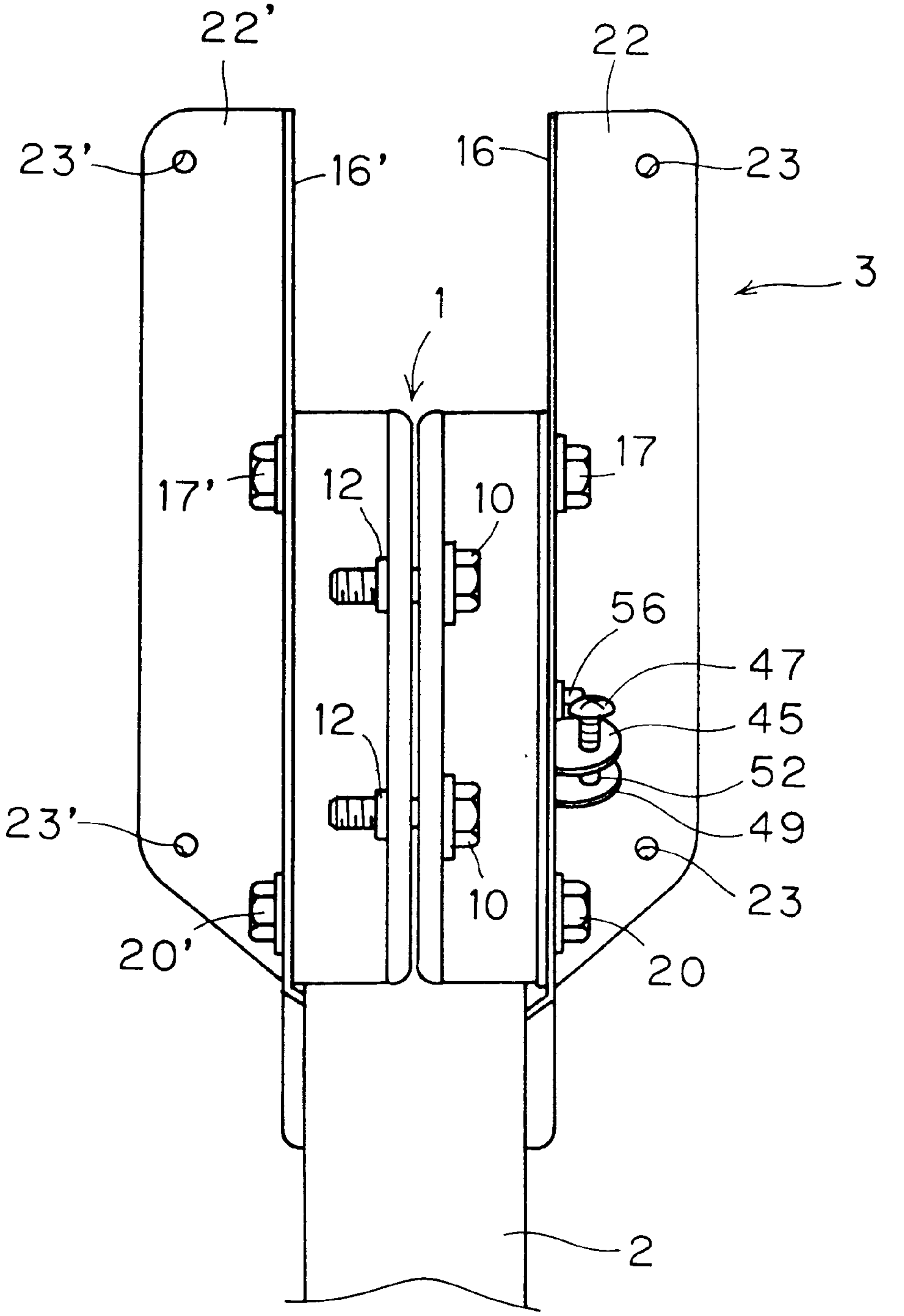
FIG. 6 is a back view with a mast fixed to the antenna fixture of FIG. 5.

An adjusting leaf 49 is allowed to be cut and raised at the position opposite to the above-mentioned supporting leaf 45 of the side wall 16. A shin tip portion 50 of the adjusting screw 47, threadably attached to the supporting plate 45, is allowed to be passingly inserted into a through hole 51 of the adjusting leaf 49 so that a base end step portion 52 of the shin tip portion 50 abuts against the adjusting leaf 49. A stopper plate 53 is externally fitted to the shin tip portion 50 and then fixedly secured in a state that the shin tip portion 50 is somewhat movable axially with respect to the adjusting leaf 49. FIG. 6 shows that the adjusting screw 47 has been threadably attached to the supporting plate 45 and the shin tip portion 50 has been fixed rotatably with respect to the adjusting leaf 49.

A middle mounting leaf 54 is allowed to be protruded at the position which is located in the middle between the upper mounting leaf 4 and the lower mounting leaf 5 of the mast fixture 1 and opposite to the above-mentioned second elevation-angle adjusting circular-arc hole 44. The middle mounting leaf 54 is provided with a tapped hole 55. A bolt 56 is passingly inserted from the wide circular-arc hole 48 into the second elevation-angle adjusting circular-arc hole 44, and threadably attached to the tapped hole 55 to fix the adjusting plate 41 to the mast fixture 1. The wide circular-arc hole 48 is formed into a wide circular-arc hole so that the bolt 56, when used to fix the adjusting plate 41, is not tightened to an extent that the side wall 16 is also tightened.

Also, where the adjusting plate 41 is positioned between the mast fixture 1 and the mount fixture 3, the azimuth angle is adjusted in a similar manner to the above, so that the description will be omitted.

The elevation angle is adjusted by loosening the axis supporting bolt 17, the bolt 20 and bolt 56 fixing the adjusting plate 41. The coarse adjustment is performed in such a manner that when the mount fixture 3 together with the adjusting plate 41 are rotated around the axis supporting bolt 17 to give a substantially required angle, the bolt 56 mounted to the second elevation-angle adjusting circular-arc hole 44 is tightened.

Although the fine adjustment is performed with the adjusting screw 47, the shin tip portion 50 of the adjusting screw 47 has been rotatably and fixedly secured to the adjusting plate 49, so that rotating the adjusting screw 47 causes the mount fixture 3 to rotate around the axis supporting bolt 17, thereby allowing the fine adjustment.

After adjustment, the axis supporting bolt 17 and the bolt 20 are tightened to fix.

Figure 7:
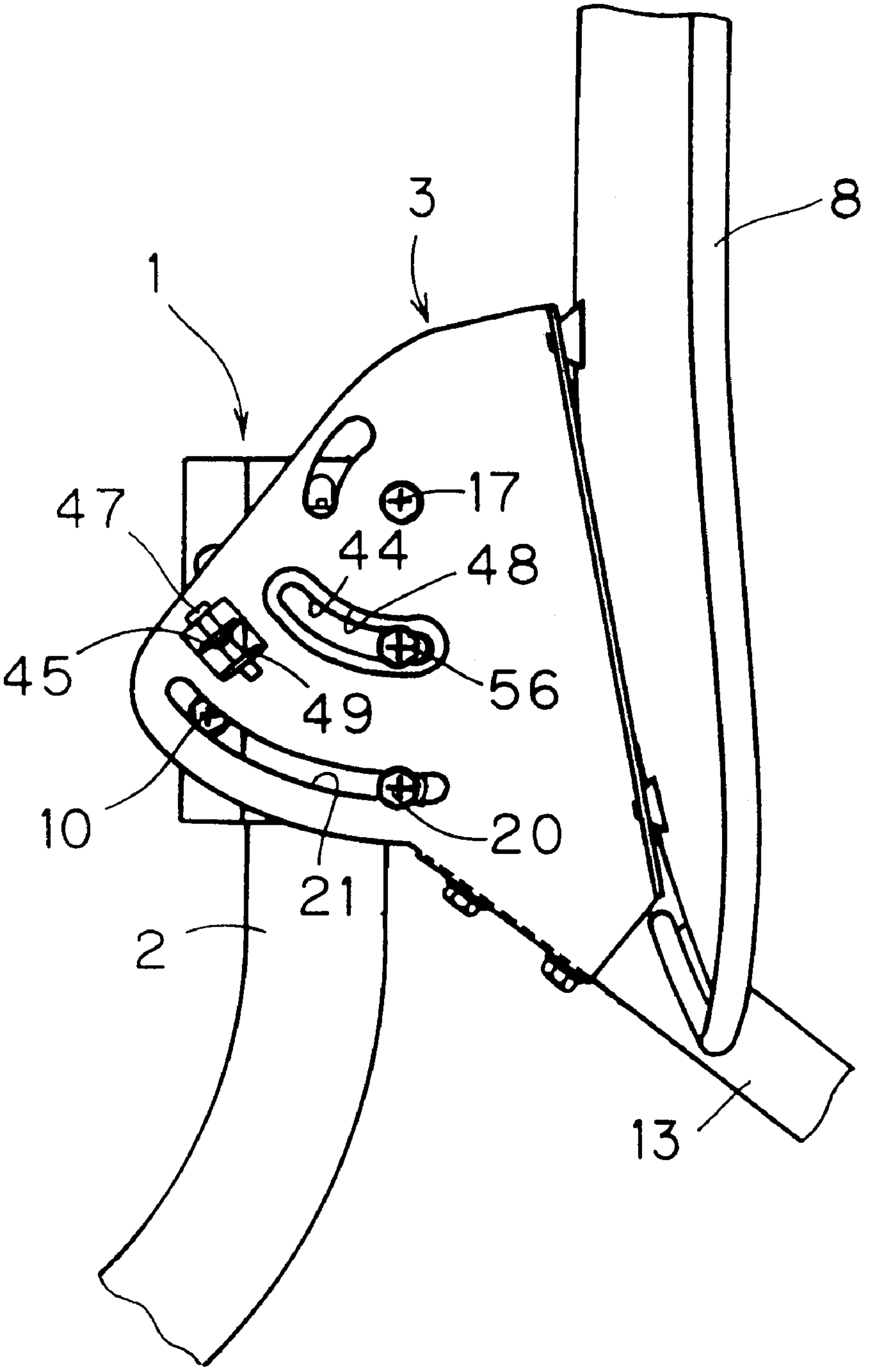
FIG. 7 is a side view of the antenna fixture of FIG. 5 with the elevation angle set at a minimum.
Figure 8:
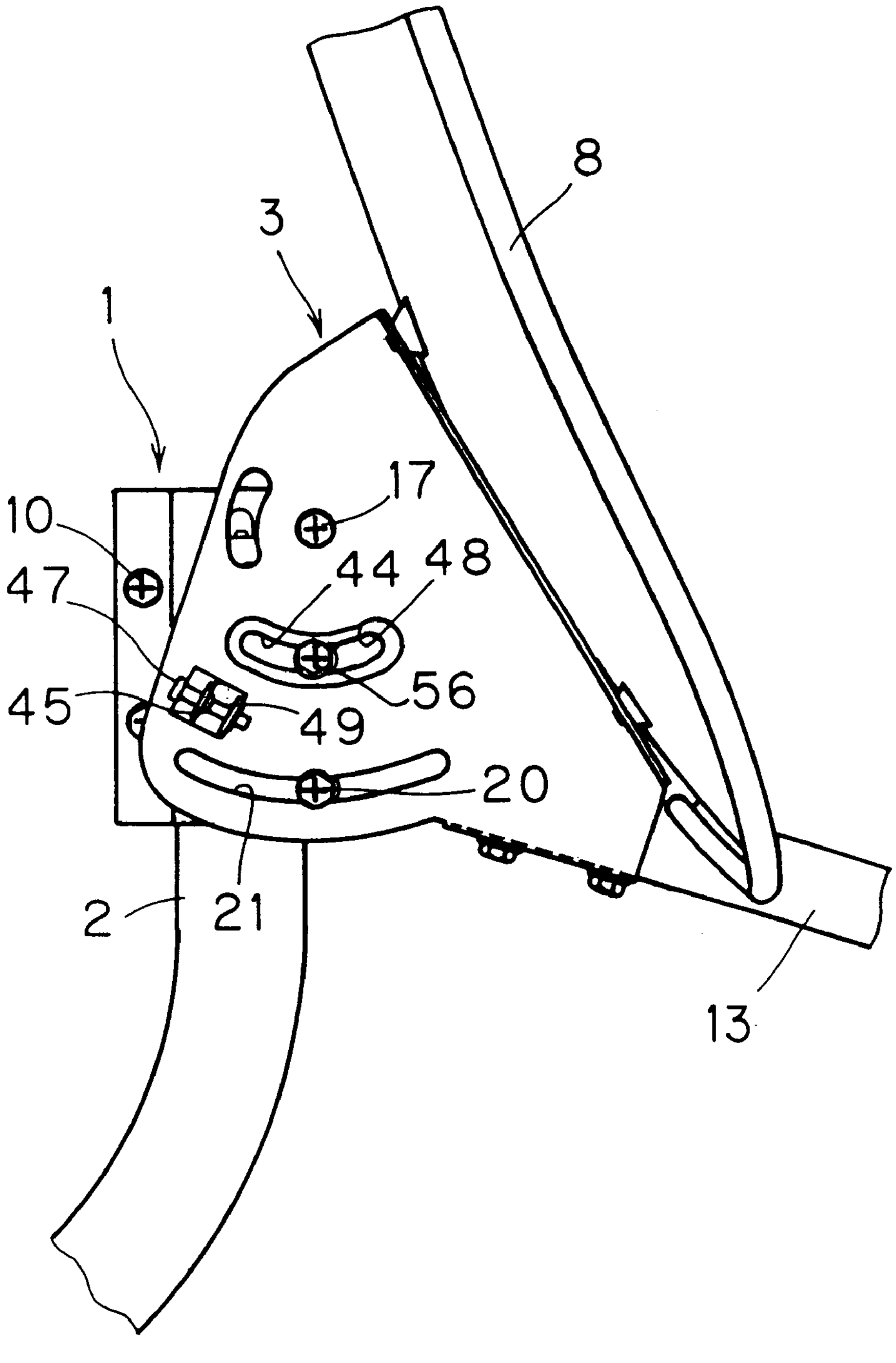
FIG. 8 is a side view of the antenna fixture of FIG. 5 with the elevation angle set at an intermediate position.
Figure 9:
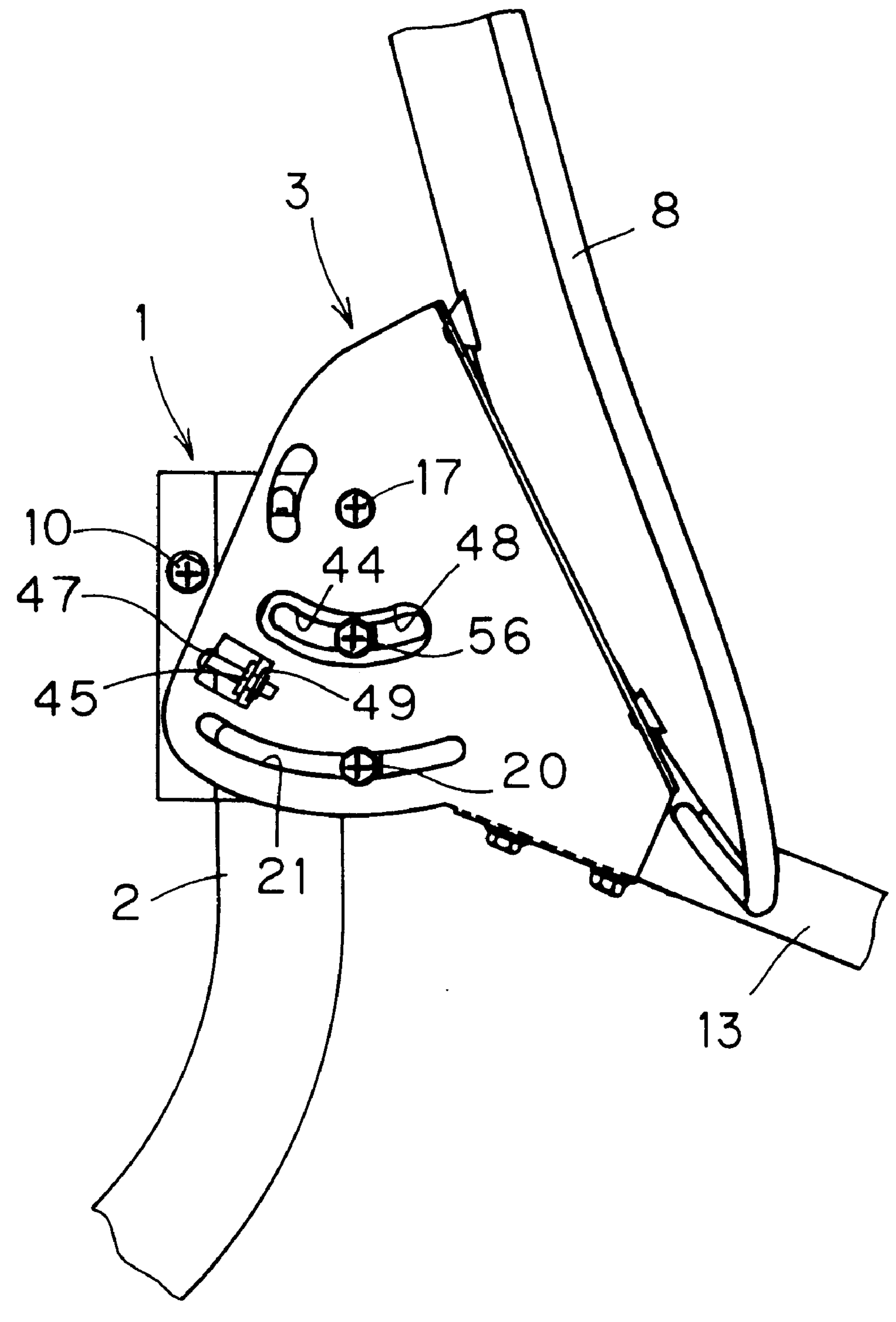
FIG. 9 is a side view antenna fixture of FIG. 8 with a gap between a supporting plate and an adjusting plate set at a minimum by fine adjustment.
Figure 10:
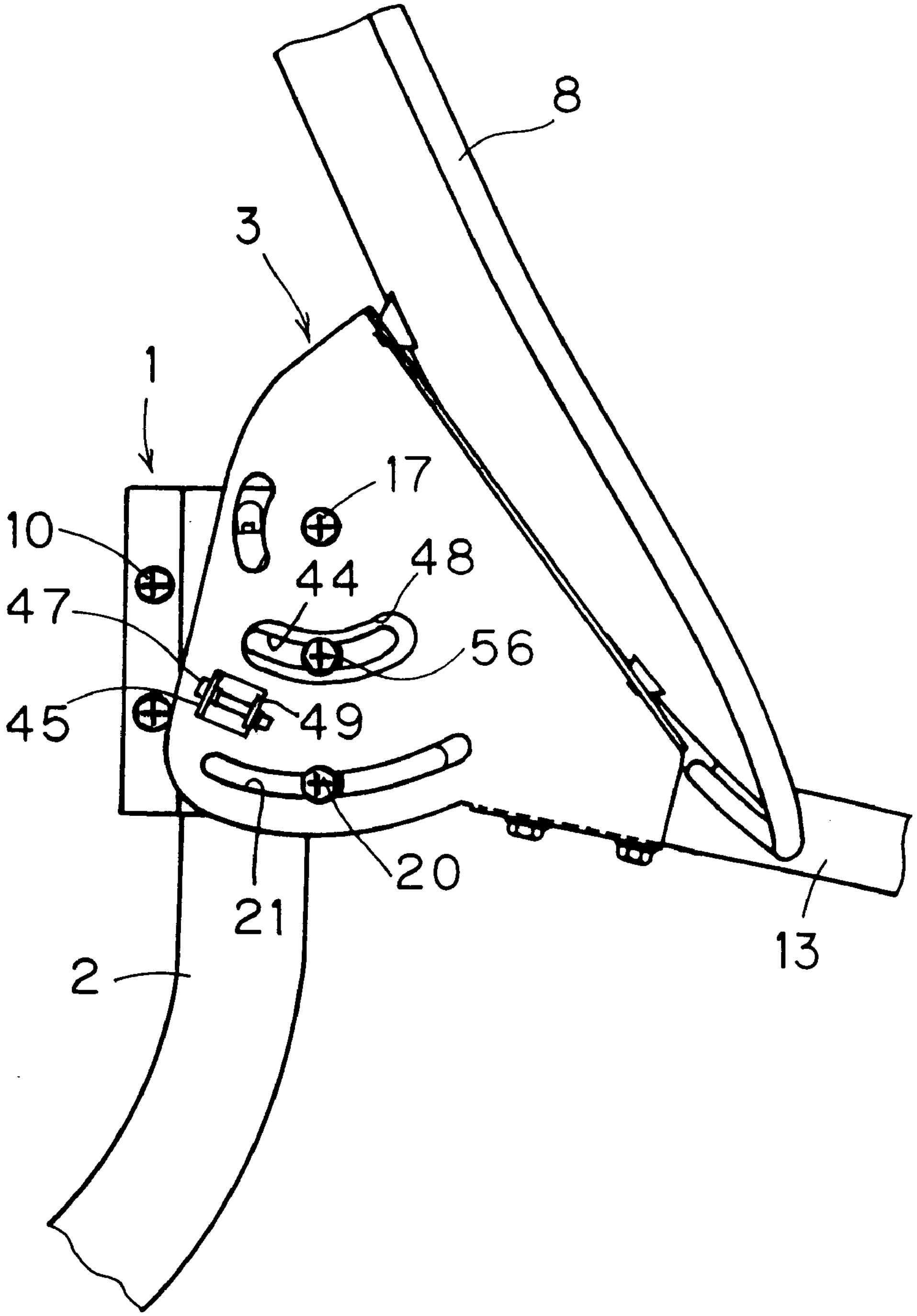
FIG. 10 is a side view antenna fixture of FIG. 8 with the gap between the supporting plate and the adjusting plate set at a maximum by fine adjustment.
Figure 11:
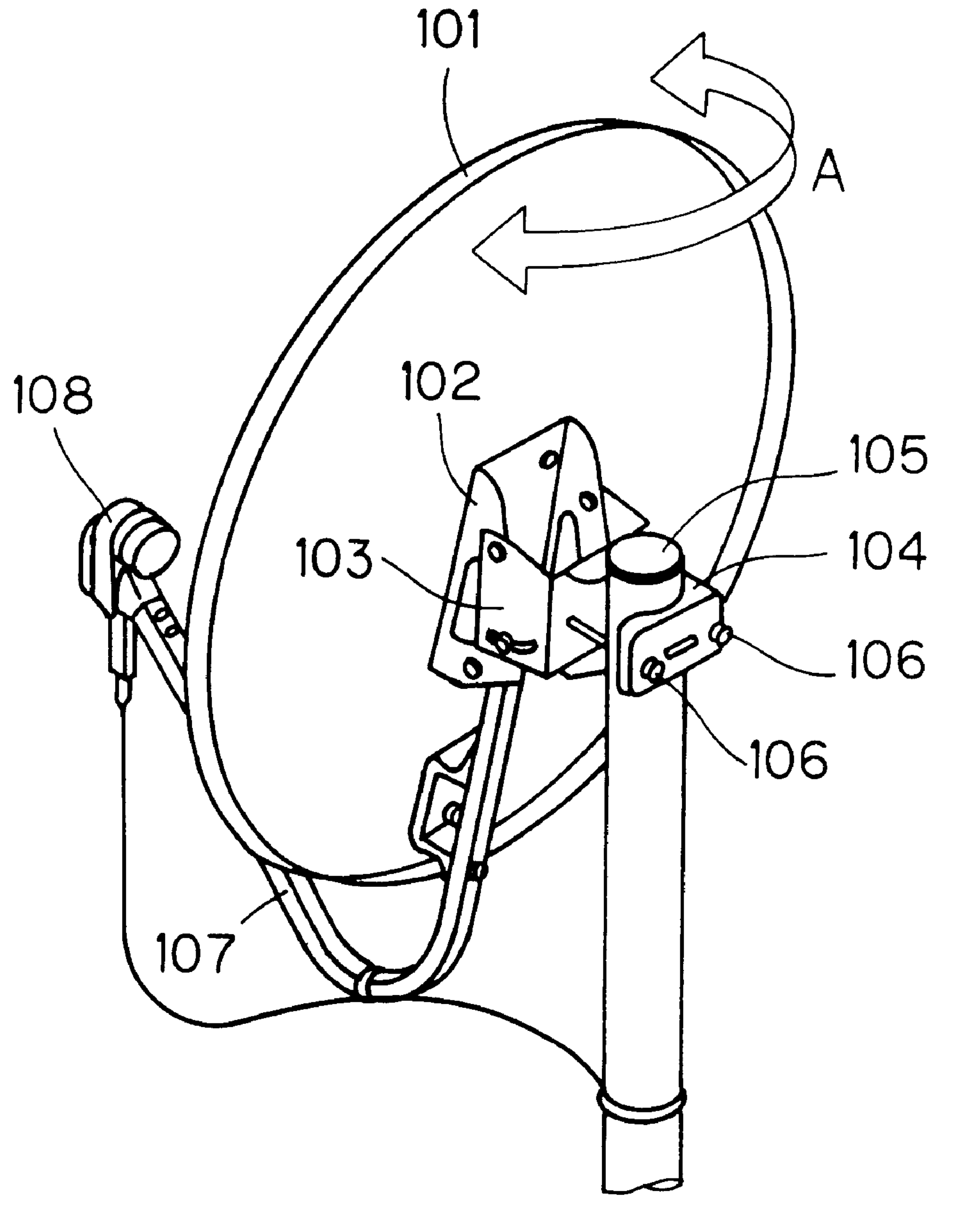
Fig. 11 PRIOR ART
FIG. 11 is a side view of a conventional antenna fixture.
Figure 12:
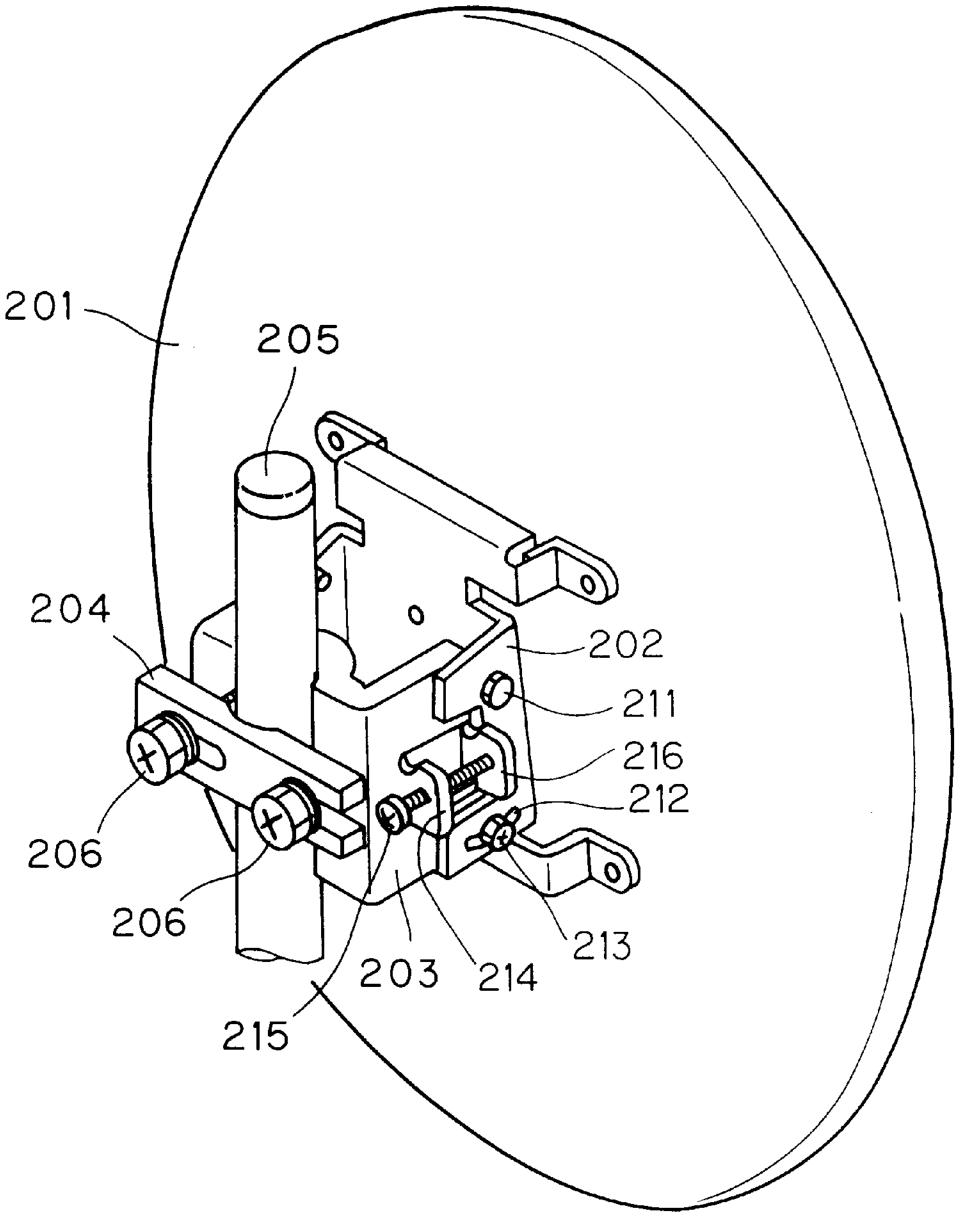
Fig. 12 PRIOR ART
FIG. 12 is a side view of another conventional antenna fixture.

FIG. 7 shows that the bolt 56 is located at the end of the second elevation-angle adjusting circular-arc hole 44 in a state that the elevation-angle is set at a minimum; FIG. 8 shows that the bolt 56 is located at the middle of the second elevation-angle adjusting circular-arc hole 44 in a state that the elevation-angle is set at a middle position; FIG. 9 shows a state that the gap between the supporting plate 45 and the adjusting plate 49 is set at a minimum by the fine adjustment. FIG. 10 shows a state that the gap between the supporting plate 45 and the adjusting plate 49 is set at a maximum by the fine adjustment.

A cross groove is engraved on the respective head of the axis supporting bolt 17, the bolt 20 and bolt 56, and the adjusting screw 47, so that the respective operation can be performed by the single screwdriver 35 provided with the shank 33 having the Phillips head at its tip. Also the same screwdriver can be used to adjust the azimuth angle, thereby allowing the work to be very easily and efficiently performed.

The coarse adjustment to the fine adjustment of the azimuth angle of a parabolic reflecting mirror can be adjusted easily and accurately by a bar tool, because, as shown above, the present invention is an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided near the axis supporting holes with azimuth-angle adjusting circular-arc holes formed around the axis supporting holes as a center, and is carvedly provided with elevation-angle adjusting circular-arc holes formed around the axis supporting holes as a center for allowing bolts to be passingly inserted and threadably attached to the tapped holes of the lower mounting leaves, wherein the mount fixture is externally fitted to the mast fixture, the axis supporting bolts are allowed to be passingly inserted into the axis supporting holes and threadably attached to the tapped holes of the upper mounting leaves, and the bolts are allowed to be passingly inserted into the elevation-angle adjusting circular-arc holes and threadably attached to the tapped holes of the lower mounting leaves, and wherein passingly inserting holes are bored in the mast fixture opposite to the azimuth-angle adjusting circular-arc holes, and a bar tool is inserted into the azimuth-angle adjusting circular-arc holes and the passingly inserting holes to adjust the azimuth-angle.

Also, a mount fixture is pressingly fitted to a mast fixture by a wave washer positioned between bolts, so that even in a state that an axis supporting bolt and bolts are loosened, the coarse adjustment to the fine adjustment can be smoothly performed and the elevation angel of a parabolic reflecting mirror can be adjusted easily and accurately, because the present invention is an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided with elevation-angle adjusting circular-arc holes formed around the axis supporting holes as a center for allowing bolts to be passingly inserted and threadably attached to the tapped holes of the lower mounting leaves, wherein the mount fixture is externally fitted to the mast fixture, the axis supporting bolts are allowed to be passingly inserted into the axis supporting holes and threadably attached to the tapped holes of the upper mounting leaves, and the bolts are allowed to be passingly inserted into the elevation-angle adjusting circular-arc holes and threadably attached to the tapped holes of the lower mounting leaves, and wherein a wave washer is positioned between the bolt and the side wall to adjust the elevation-angle.

Further, the azimuth angle and elevation angel of a parabolic reflecting mirror can be adjusted simply and accurately, because the present invention is an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided near the axis supporting holes with azimuth-angle adjusting circular-arc holes formed around the axis supporting holes as a center, and is carvedly provided with elevation-angle adjusting circular-arc holes formed around the axis supporting holes as a center for allowing bolts to be passingly inserted and threadably attached to the tapped holes of the lower mounting leaves, wherein the mount fixture is externally fitted to the mast fixture, the axis supporting bolts are allowed to be passingly inserted into the axis supporting holes and threadably attached to the tapped holes of the upper mounting leaves, and the bolts are allowed to be passingly inserted into the elevation-angle adjusting circular-arc holes and threadably attached to the tapped holes of the lower mounting leaves, and wherein passingly inserting holes are bored in the mast fixture opposite to the azimuth-angle adjusting circular-arc holes, a bar tool is inserted into the azimuth-angle adjusting circular-arc holes and the passingly inserting holes to adjust the azimuth-angle, and a wave washer is positioned between the bolt and the side wall to adjust the elevation-angle.

Still further, with an adjusting plate positioned between a mast fixture and a mount fixture, the coarse adjustment to the fine adjustment of the elevation angel of a parabolic reflecting mirror can be adjusted easily and accurately, because the present invention is an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided with elevation-angle adjusting circular-arc holes formed around the axis supporting holes as a center for allowing bolts to be passingly inserted and threadably attached to the tapped holes of the lower mounting leaves, wherein an adjusting plate is positioned between said mount fixture and the mast fixture, and is bored on the upper portion thereof with an adjusting plate axis supporting hole into which the axis supporting bolt is passingly inserted, carvedly provided at the position opposite to the elevation-angle adjusting circular-arc hole on the lower portion thereof with an adjusting plate elevation-angle adjusting circular-arc hole, and carvedly provided on the central portion thereof with a second elevation-angle adjusting circular-arc hole formed around the adjusting plate axis supporting hole as a center, and an adjusting screw is threadably attached to a supporting plate raised sideward, wherein the mount fixture is externally fitted to the mast fixture, the axis supporting bolts are allowed to be passingly inserted into the axis supporting holes and the adjusting plate axis supporting holes and threadably attached to the tapped holes of the upper mounting leaves, and the bolts are allowed to be passingly inserted into the elevation-angle adjusting circular-arc holes and the adjusting plate elevation-angle adjusting circular-arc holes and threadably attached to the tapped holes of the lower mounting leaves, and wherein a wide circular-arc hole is carvedly provided on the side wall opposite to the second elevation-angle adjusting circular-arc hole, an adjusting leaf is allowed to be raised on the side wall opposite to the supporting leaf, and the tip of said adjusting screw is rotatably fixed to the adjusting leaf to adjust the elevation angle.

Also, the azimuth angle and elevation angel can be adjusted simply and accurately, because the present invention is an antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided near the axis supporting holes with azimuth-angle adjusting circular-arc holes formed around the axis supporting holes as a center, and is carvedly provided with elevation-angle adjusting circular-arc holes formed around the axis supporting holes as a center for allowing bolts to be passingly inserted and threadably attached to the tapped holes of the lower mounting leaves, wherein an adjusting plate is positioned between said mount fixture and the mast fixture, and is bored on the upper portion thereof with an adjusting plate axis supporting hole into which the axis supporting bolt is passingly inserted, carvedly provided at the position opposite to the elevation-angle adjusting circular-arc hole on the lower portion thereof with an adjusting plate elevation-angle adjusting circular-arc hole, and carvedly provided on the central portion thereof with a second elevation-angle adjusting circular-arc hole formed around the adjusting plate axis supporting hole as a center, and an adjusting screw is threadably attached to a supporting plate raised sideward, wherein the mount fixture is externally fitted to the mast fixture, the axis supporting bolts are allowed to be passingly inserted into the axis supporting holes and the adjusting plate axis supporting holes and threadably attached to the tapped holes of the upper mounting leaves, and the bolts are allowed to be passingly inserted into the elevation-angle adjusting circular-arc holes and the adjusting plate elevation-angle adjusting circular-arc holes and threadably attached to the tapped holes of the lower mounting leaves, and wherein a wide circular-arc hole is carvedly provided on the side wall opposite to the second elevation-angle adjusting circular-arc hole, an adjusting leaf is allowed to be raised on the side wall opposite to the supporting leaf, the tip of said adjusting screw is rotatably fixed to the adjusting leaf to adjust the elevation angle, and a bar tool is inserted into the azimuth-angle adjusting circular-arc holes and the passingly inserting holes to adjust the azimuth-angle.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided near the axis supporting holes with azimuth-angle adjusting circular-arc holes formed around the axis supporting holes as a center, and is carvedly provided with elevation-angle adjusting circular-arc holes formed around the axis supporting holes as a center for allowing bolts to be passingly inserted and threadably attached to the tapped holes of the lower mounting leaves, wherein the mount fixture is externally fitted to the mast fixture, the axis supporting bolts are allowed to be passingly inserted into the axis supporting holes and threadably attached to the tapped holes of the upper mounting leaves, and the bolts are allowed to be passingly inserted into the elevation-angle adjusting circular-arc holes and threadably attached to the tapped holes of the lower mounting leaves, and wherein passingly inserting holes are bored in the mast fixture opposite to the azimuth-angle adjusting circular-arc holes, and a bar tool is inserted into the azimuth-angle adjusting circular-arc holes and the passingly inserting holes to adjust the azimuth-angle.

2. The antenna fixture as set forth in claim 1 wherein a wave washer is positioned between the bolt and the side wall to adjust the elevation-angle.

3. An antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided with elevation-angle adjusting circular-arc holes formed around the axis supporting holes as a center for allowing bolts to be passingly inserted and threadably attached to the tapped holes of the lower mounting leaves, wherein the mount fixture is externally fitted to the mast fixture, the axis supporting bolts are allowed to be passingly inserted into the axis supporting holes and threadably attached to the tapped holes of the upper mounting leaves, and the bolts are allowed to be passingly inserted into the elevation-angle adjusting circular-arc holes and threadably attached to the tapped holes of the lower mounting leaves, and wherein a wave washer is positioned between the bolt and the side wall to adjust the elevation-angle.

4. An antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided with elevation-angle adjusting circular-arc holes formed around the axis supporting holes as a center for allowing bolts to be passingly inserted and threadably attached to the tapped holes of the lower mounting leaves, wherein an adjusting plate is positioned between said mount fixture and the mast fixture, and is bored on the upper portion thereof with an adjusting plate axis supporting hole into which the axis supporting bolt is passingly inserted, carvedly provided at the position opposite to the elevation-angle adjusting circular-arc hole on the lower portion thereof with an adjusting plate elevation-angle adjusting circular-arc hole, and carvedly provided on the central portion thereof with a second elevation-angle adjusting circular-arc hole formed around the adjusting plate axis supporting hole as a center, and an adjusting screw is threadably attached to a supporting plate raised sideward, wherein the mount fixture is externally fitted to the mast fixture, the axis supporting bolts are allowed to be passingly inserted into the axis supporting holes and the adjusting plate axis supporting holes and threadably attached to the tapped holes of the upper mounting leaves, and the bolts are allowed to be passingly inserted into the elevation-angle adjusting circular-arc holes and the adjusting plate elevation-angle adjusting circular-arc holes and threadably attached to the tapped holes of the lower mounting leaves, and wherein a wide circular-arc hole is carvedly provided on the side wall opposite to the second elevation-angle adjusting circular-arc hole, an adjusting leaf is allowed to be raised on the side wall opposite to the supporting leaf, and the tip of said adjusting screw is rotatably fixed to the adjusting leaf to adjust the elevation angle.

5. An antenna fixture comprising a mount fixture for mounting a parabolic reflecting mirror and a mast fixture fixed to a mast and connected to said mount fixture to make it possible to adjust the azimuth angle and elevation angle of the parabolic reflecting mirror, wherein the mast fixture is a cylindrical body capable of being externally fitted to the mast and tighteningly fixed, forms upper mounting leaves and lower mounting leaves, which are parallel to each other in the tangent line direction and opposite to each other, on the upper and lower part of the cylindrical body, the upper mounting leaves and the lower mounting leaves being provided with tapped holes, wherein the mount fixture is extendedly provided with side walls, which are externally fitted to said upper mounting leaves and lower mounting leaves, on both sides of a base wall, and is bored with axis supporting holes which allow axis supporting bolts to be passingly inserted and threadably attached to the tapped holes of the upper mounting leaves, and is carvedly provided near the axis supporting holes with azimuth-angle adjusting circular-arc holes formed around the axis supporting holes as a center, and is carvedly provided with elevation-angle adjusting circular-arc holes formed around the axis supporting holes as a center for allowing bolts to be passingly inserted and threadably attached to the tapped holes of the lower mounting leaves, wherein an adjusting plate is positioned between said mount fixture and the mast fixture, and is bored on the upper portion thereof with an adjusting plate axis supporting hole into which the axis supporting bolt is passingly inserted, carvedly provided at the position opposite to the elevation-angle adjusting circular-arc hole on the lower portion thereof with an adjusting plate elevation-angle adjusting circular-arc hole, and carvedly provided on the central portion thereof with a second elevation-angle adjusting circular-arc hole formed around the adjusting plate axis supporting hole as a center, and an adjusting screw is threadably attached to a supporting plate raised sideward, wherein the mount fixture is externally fitted to the mast fixture, the axis supporting bolts are allowed to be passingly inserted into the axis supporting holes and the adjusting plate axis supporting holes and threadably attached to the tapped holes of the upper mounting leaves, and the bolts are allowed to be passingly inserted into the elevation-angle adjusting circular-arc holes and the adjusting plate elevation-angle adjusting circular-arc holes and threadably attached to the tapped holes of the lower mounting leaves, and wherein a wide circular-arc hole is carvedly provided on the side wall opposite to the second elevation-angle adjusting circular-arc hole, an adjusting leaf is allowed to be raised on the side wall opposite to the supporting leaf, the tip of said adjusting screw is rotatably fixed to the adjusting leaf to adjust the elevation angle, and a bar tool is inserted into the azimuth-angle adjusting circular-arc holes and the passingly inserting holes to adjust the azimuth-angle.

* * * * *

UNITED STATES PATENT AND TRADEMARK OFFICE

CERTIFICATE OF CORRECTION

PATENT NO. : 5,941,497

DATED : August 24, 1999

INVENTOR(S) : Inoue et al.

It is certified that error appears in the above-indentified patent and that said Letters Patent is hereby corrected as shown below:

On the title page, in category (73) Assignee, change "DX Anteena Co., Ltd." to --DX Antenna Co., Ltd.--

Signed and Sealed this

Thirtieth Day of May, 2000

Attest:

Q. TODD DICKINSON

Attesting Officer

*Director of Patents and Trademarks*